United States Patent

[11] 3,607,667

[72] Inventors Edward M. Knapp
951 North Livingston St., Arlington County, Va. 22005;
Stephen J. Nesbitt, 1111 Massachusetts Ave., Washington, D.C. 20005
[21] Appl. No. 606,261
[22] Filed Dec. 30, 1966
[45] Patented Sept. 21, 1971

[54] DESALINATION OF WATER BY HEAT EXCHANGE, MICROWAVE HEATING AND FLASH DISTILLATION
3 Claims, 3 Drawing Figs.

[52] U.S. Cl. ................................................. 203/11,
203/22, 203/88, 203/90, 203/100, 202/187, 202/238, 159/6, 219/10.55
[51] Int. Cl. .............................................. B01d 3/06
[50] Field of Search ........................................... 203/100,
88, 10, 11, 24, 26, 22, 90; 202/238, 236, 187, 235; 159/6; 219/10.55

[56] References Cited
UNITED STATES PATENTS

| | | | |
|---|---|---|---|
| 2,455,812 | 12/1948 | Schlesman | 203/100 |
| 2,486,684 | 11/1949 | Schlesman | 203/100 |
| 3,307,010 | 2/1967 | Puschner | 219/10.55 |
| 3,367,848 | 2/1968 | Curtis et al. | 203/100 |
| 2,978,562 | 4/1961 | Fox | 219/10.55 |
| 444,152 | 1/1891 | Madlener | 202/236 |
| 1,966,938 | 7/1934 | Stone | 203/26 |
| 2,996,439 | 8/1961 | Glover | 203/11 |
| 3,200,050 | 8/1965 | Hogan et al. | 203/24 |
| 3,204,687 | 9/1965 | Sargent | 159/6 |
| 3,209,812 | 10/1965 | Sargeant | 203/100 |
| 3,334,420 | 8/1967 | Zeff et al. | 202/236 |

Primary Examiner—Wilbur L. Bascomb, Jr.
Attorney—Linton & Linton

ABSTRACT: A process and the apparatus for the desalination of water by flash distillation. The Distillation operation is performed in five steps initiating with (1) counter current heat exchange of the water with hot fresh desalinated water; (2) generating heat throughout the body of water by the application of microwave energy; (3) passing the water in counter current heat exchange with super heated stem; (4) reducing the pressure on the water thereby causing flash vaporization and (5) separating the solute by centrifugal action. The apparatus comprises a central pipe having flat ducts in sets of four.

PATENTED SEP21 1971  3,607,667
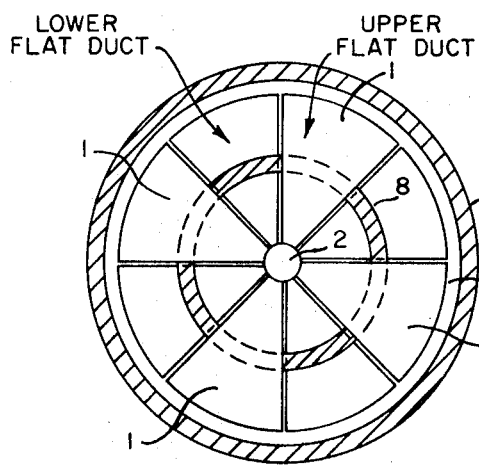
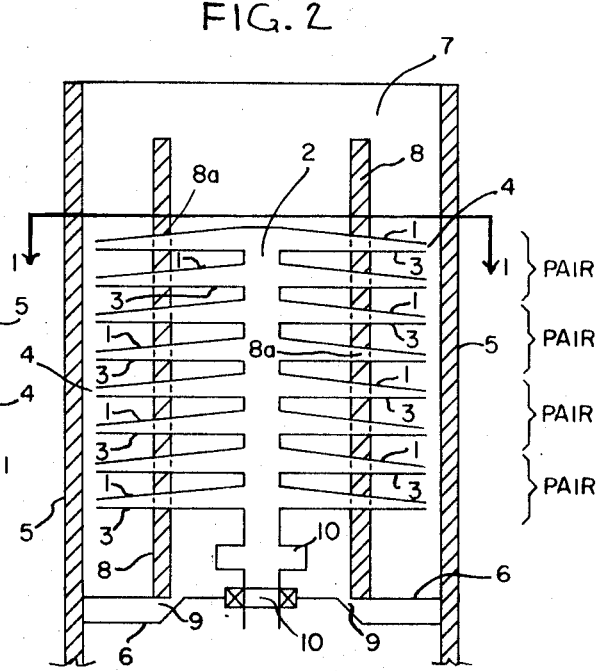
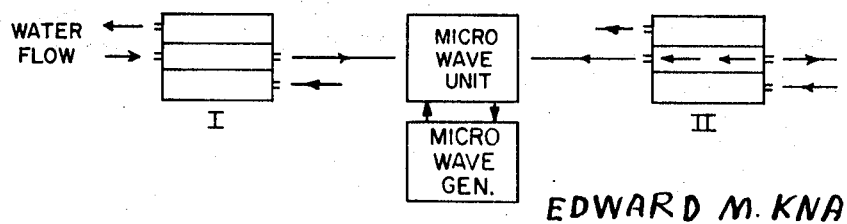
INVENTORS
EDWARD M. KNAPP AND
STEPHEN J. NESBITT
By Linton and Linton
ATTORNEYS

DESALINATION OF WATER BY HEAT EXCHANGE, MICROWAVE HEATING AND FLASH DISTILLATION

This invention is directed to a system for the desalination of water and the cleaning of polluted water. One object of the invention is to provide an economical means of desalting or purifying water in an apparatus to be built in module configuration, each module capable of treating a limited amount of water, the module being used to provide water for a specific small application, examples of such applications being a small industrial plant, or militarily, an independent troop unit, or a small naval vessel. The concept provides the capability of combining any number of modules into a unified plant, such a plant to have any desired capacity in terms of multiples of the module capacity, up to and including capacity in the multimillion gallon a day range.

A second object is to create means of providing potable water by treating a variety of kinds of unpotable water, sea water, inland saline waters rich in the calcium sulfate complex, and polluted nonsaline water such as river water, industrial waste water, and untreated sewage water.

The prior art in the field of desalination provides a variety of methods such as distillation, electrodialysis or separation by osmosis through one or more membranes, freezing, humidification, hydrate treatment, and chemical treatment coupled with solvent extraction. The prior art in the cleaning of polluted water uses chemical additives and mechanical means. In the prior art the technologies are not linked. The present invention was conceived of as a means for desalination, but on examination it proves to be efficient for purification and it will become the new art in both fields.

Flash distillation in the prior art calls for treatment in a number of stages, each stage distilling only a small fraction of the water fed to it, thus requiring many stages to achieve acceptable efficiency, requiring the duplication of equipment for each stage, and using heat wastefully. The breakthrough in the present invention is the single stage, combined with the technique which prepares the water for flash distillation to be complete in the single stage, which for good reasons is not possible in conventional practice.

The essence of the present invention is the use of a new and novel device for the flash distillation, combined with the use of microwave energy as a primary heating element.

Microwave energy as a source of heat in the distillation of water is important because it generates heat in situ, in each and every spatial unit within the body of water, at the face at which the microwave energy enters the water and simultaneously at substantial distances away from that face, and does this while the moving water is passing through a target area exposed to the energy. Thus, the microwave energy heats all of the water to the same temperature simultaneously. This differs from the conventional practice of heating water by transferring heat to it from a hot body through a separating barrier wall. In conventional heat transfer the water near the separating wall gets very hot and transfers this heat to water farther from the wall, this water in turn transferring heat to water still farther away. Thus any body of water being so heated has within it a wide variety of temperatures and much of the body does not have the enthalpy at which it would boil. This fact accounts for the phenomenon which brings about the multiplicity of stages of flash distillation and the duplicate apparatus.

In the present invention the incoming cold water is heated to a temperature of approximately 208° F. by the reuse of heat in conventional heat transfer apparatus. The heat to be reused in this way comes from hot treated and now fresh water which has been put through the system, but which at the hot end of the conventional apparatus retains enough heat at a temperature higher than that to which it is planned to raise the incoming water to accomplish the required heating. As the fresh water reaches the cool end of this conventional heat transfer apparatus its temperature closely approaches the minimum temperature of the incoming saline or polluted water.

Microwave energy is applied to the heated saline or polluted water leaving this first conventional type heat transfer unit, and almost instantaneously it heats all of the body of water to its boiling point temperature at normal atmospheric pressures. Such water will all flash at once when the heat of vaporization is supplied because all of it is at the temperature at which it can absorb the heat of vaporization, provided of course that the source of the heat of vaporization is adequate. The present invention takes this into account and uses both the steam produced in the vaporization process and additional heat from a source within the system.

It should be pointed out that this present application claims nothing as to the generation of microwave energy, the equipment for this purpose being well known in the art and being available for off the shelf purchase from any one of several manufacturers. The same statement applies to the microwave heating unit included in the present invention. As for description of that unit, it consists of a water channel of dimensions governed by the wave length of the microwave energy used, made of materials transparent to microwave energy, said channel intersecting a waveguide through which microwave energy is moving, the intersection being at such an angle that the energy passes into the water to a depth substantially greater than 1 wavelength. While the microwave equipment is conventional, its generation of heat in situ instead of transfer of heat from outside is not, particularly with respect to the flash distillation of water.

The use of microwave energy, a subordinate element of the present invention, has been discussed first so that its role in making possible the flash distillation in a single stage may be understood. With the application of microwave energy there is no unit of weight or volume within a body of water moving to the point at which it is to flash which has not attained a temperature sufficient to permit it to flash when presented with that increment of heat known as the heat of vaporization. There is therefore no unit of weight or volume of water which can absorb the appropriate amount of the heat of vaporization without attaining the enthalpy consonant only with the gaseous state. None of it can absorb this heat without flashing, so it flashes instantly and totally, without requiring the multiplicity of passes which characterize the present practice.

This is done in the flashing apparatus which is central to the present invention, a heat exchanger fabricated in a new and novel form. The water is passed in a very thin film across a rotating surface heated by superheated steam. The steam is generated as saturated steam by absorbing heat from the superheated steam through the rotating surface and is so generated at normal pressures. Additional heat is supplied to this steam by coils located in the steam chest into which the saturated steam is discharged and to further superheat it, this superheated steam is drawn past the rotating surfaces by a blower which creates a slight vacuum. With the temperature differential created by the additional heat, the heat of vaporization is transferred from the steam to the water being changed into steam. It is important to note here that in the change of state from water to steam the mineralized or other materials which in solution cause water to be saline or polluted are expelled from solution and become particulate solids which can be separated from the steam.

The surface between superheated steam and water to be flashed is rotating at sufficient speed to apply centrifugal force to the particulate solids present and these particles are driven radially across the surface and beyond it to the outer containing wall of a steam chest surrounding and enveloping the apparatus. From this outer wall they are collected and removed by conventional means. The steam is drawn up and away from these outer containing walls and drawn down past the surfaces. Thus each unit of water having been changed into steam by heat from the preceding unit of water which has previously been changed to steam then turns around and (1) gives up its heat sufficiently to the next succeeding unit of water which is passing through the system to change that unit to steam, and (2) itself back to water.

It should be noted here that a portion of the power fed to the microwave generating assembly emerges as heat rather than as microwave power. This heat is released through a water coolant system at a temperature well in excess of the boiling point temperature used in the flashing apparatus. This heat is then routed to coils in the steam chest A to provide the additional heat and the temperature differential required to drive the heat of vaporization into the water being flashed.

To describe the flashing apparatus in physical terms, the saline or polluted water flows upward in a vertical pipe and is distributed to a multiplicity of rotating surfaces all disposed within a single stage flashing apparatus. At appropriate intervals there are attached to the vertical pipe a pair of surfaces the lower one of which is attached perpendicularly to the pipe, and the upper of which, a short distance above the first, is attached at a dihedral angle, slanting downward. The two surfaces are not joined at the ends fartherest from the central vertical pipe, but they are joined along the radial sides to form a flat conduit.

Each such pair of surfaces as described above is fabricated in the shape of a maltese cross to the end that the four arms of each maltese cross cover 50 percent of the area of a larger pipe in which the vertical pipe carrying water is centered. Each such pair as described is perfectly matched at a short distance above it by a second pair of maltese cross surfaces, rotated 90° from the pair below it, so that the combination of two pairs covers 100 percent of the area of the larger pipe and at the same time leaves 50 percent of the pipe area open for the tortuous passage of steam.

The tips of the several maltese cross surfaces project through the wall of the outer and larger pipe described, moving in a slit in said pipe wall and discharging into a steam chest into which all the material being flashed moves, with the steam curling up and away in response to the slight vacuum created by the blower, and the solid particles continue in straight lines to the outer wall of the steam chest from which they are removed by conventional means.

In the distribution of water from the central pipe to the multiplicity of surfaces, the water moves at a high velocity created first by the pumping pressure behind the flow of water and second by the velocity imparted by the spinning of the surfaces. The result is that the water assumes the fluid shape of an extremely thin film, too thin to be affected by the laminar effect which normally interferes with the boiling of water flowing over a hot surface. The downward slant of the inside of the spinning upper surface holds the water close to that surface, and the geometric characteristics of the maltese cross surface add to the velocity effect in spreading the water very thin. As this occurs the water is forced to flash to steam all at once, with the particulate matter being expelled and because of inertia flying away from the steam in straight lines.

Having defined the invention we further define it by reference to the drawings which are attached: FIG. 1 is a view of a single part of the flashing apparatus a single maltese cross-shaped surface viewed from directly above it on section line 1—1 of FIG. 2. FIG. 2 is a side view of a multiplicity of sections similar to that shown in FIG. 1, and including supplemental equipment which would be seen in such a view. FIG. 3 is a simplified flow chart of the entire system, in which unit $b$ is a symbolic representation of the total apparatus shown in FIG. 2, and in which unit $a$ is a symbolic representation of a conventional heat exchanger referred to in the text and for which no coverage is included in this application. The microwave unit cannot be shown by symbols since the industry which produces it has developed no standard symbol. In the operation of this system the incoming cold water enters unit $a$, then moves to the microwave unit, then is flashed in unit $b$, from whence the fresh or treated water returns to unit $a$ bypassing the microwave unit and gives up its residual heat.

Upper surface of maltese cross section 1 is attached to incoming water pipe 2 by conventional means such as welding. Lower surface 3 is similarly attached. Steam flashed on the under side of upper surface 1 passes through open tip 4 located between surfaces 1 and 3, while the solid particulate matters expelled from solution also passes through open tip 4 and impinges on the outer wall 5 of the steam chest from which they are assembled on base plate 6 from whence they are removed from the overall system by any one of several conventional means not shown.

The steam which has been created by flash distillation on the under side of surface 1 and which has passed through tip 4 curls up and away into the open space in the steam chest 7, from whence it is drawn down into pipe 8 and down past surfaces 1 and 3 to release its heat of vaporization into the water being flashed. Fresh water created by condensation of this steam in the process of giving up its heat of vaporization flows down the inside of pipe 8 and is collected in drain 9 from whence it is pumped back to the conventional heat exchanger included in the system but not shown in the drawings because of its very conventionality. Water pipe 2 and surfaces 1 and 3 are to be considered as one unit which is rotating because of the pressure applied to the incoming water by pumps which pressure is transferred to baffles mounted on the inside of pipe 2. These baffles are conventional design features and thus are not shown in the drawings.

Tips 4 pass in rotation outside of the pipe 8 and are permitted to rotate through slits in pipe 8 with each maltese cross section having dimensions such that the maltese cross-shaped section fits snugly into the slit to prevent the escape of fresh water, the slits numbered 8$a$ in order to denote the close relationship of each to pipe 8. Bearing 10 permits the rotation of the unit composed of water pipe 2 and surfaces 1 and 3. The steam passing from open space 7 into pipe 8 is drawn down and around the rotating unit by blower 11 which is of conventional design and is shown only by a box attached to pipe 2, the box showing the location.

Pipe 8 consisting of sections separated by slits 8$a$ is supported by multiple struts attached between outer wall 5 and pipe 8, the struts not being shown in order to avoid confusion in the drawing, and also because in combination they are a conventional means.

In FIG. 2 eight section similar to the unit shown in FIG. 1 are depicted. Since they come in pairs, four units are shown. In the use of this invention the number of units would be governed by the number of square feet of heat transfer surface required, and by the dimensions of each maltese cross section. The requirement for heat transfer area would be governed by the number of gallons of fresh water per hour the unit is designed for and thus this is not affected by the patentable art. Conversely the patentable art is not limited to the number of sections shown in these drawings.

Having thus described our invention we claim:

1. A method for single step total flash distillation of water consisting of the following operations: (1) raising the enthalpy of the water to be distilled to the verge of flashing by counter current heat exchange with very hot fresh water produced within the method; (2) raising its enthalpy still farther by generating heat in situ throughout the body of water by the application of microwave energy; (3) providing the heat of vaporization by counter current heat exchange with superheated steam; (4) causing flashing to occur in an area of relatively lower pressure having the effect of a slight vacuum; and (5) separating the particulate matter expelled from the solute system by the change of state through the use of centrifugal means, the five operations cited occurring simultaneously in a continuous manner upon a stream of water passing through the method.

2. Apparatus consisting of a centrally located pipe, rotating on a vertical and longitudinal axis, flat ducts attached to said centrally located pipe in a maltese cross configuration and in sets of four, each individual flat duct having closed radial edges, an upper surface canted with respect to the longitudinal axis of the centrally located pipe and a lower surface perpendicular to said longitudinal axis of the centrally located pipe, an opening connecting with the centrally located pipe for the passage of liquid and an opening in the outward end of said duct for the passage of vapor, steam, and particulate matter, the apparatus hereinbefore described enclosed in a larger pipe in which a slit permitting the tips of each of the four flat ducts comprising a set to protrude and discharge vapor, steam, and particulate matter into a still larger steam chest which encloses all the apparatus hereinbefore described and which communicates at the top thereof with the larger pipe within which the sets of four ducts rotate.

3. Apparatus similar to that described in claim 2 except that there is a multiplicity of sets of four flat ducts, the multiplicity arrayed in pairs in which the second or lower member of the pair is attached to the central pipe with a permanent rotation of 90°, the effect being to provide an open but tortuous path for the passage of vapor around and between the sets of flat ducts, it being understood that in the wall of the larger pipe inside the steam chest there is a multiplicity of slits, one for each set of four flat ducts.